US005400240A

United States Patent [19]

Araki

[11] Patent Number: 5,400,240

[45] Date of Patent: Mar. 21, 1995

[54] POWER CONVERTER APPARATUS

[75] Inventor: Hiroshi Araki, Inazawa, Japan

[73] Assignee: Mitsubishi Denki Kabushiki, Tokyo, Japan

[21] Appl. No.: 25,794

[22] Filed: Mar. 3, 1993

[30] Foreign Application Priority Data

Mar. 9, 1992 [JP] Japan ................................ 4-050493

[51] Int. Cl.[6] ........................ H02M 7/515; H02P 5/40

[52] U.S. Cl. ........................................ 363/97; 363/131; 318/800; 318/808

[58] Field of Search ............................ 363/95, 97, 131; 323/237; 318/800, 808

[56] References Cited

U.S. PATENT DOCUMENTS

| | | | |
|---|---|---|---|
| 4,607,355 | 8/1986 | Koide | 369/44 |
| 4,729,082 | 3/1988 | Sato | 363/41 |
| 4,808,903 | 2/1989 | Matsui et al. | 318/800 |
| 4,858,100 | 8/1989 | Tatara | 363/161 |
| 4,875,149 | 10/1989 | Rozman et al. | 363/41 |

FOREIGN PATENT DOCUMENTS 63-95879 4/1988 Japan .

*Primary Examiner*—Steven L. Stephan
*Assistant Examiner*—Adolf Berhane
*Attorney, Agent, or Firm*—Leydig, Voit & Mayer

[57] ABSTRACT

A power converter apparatus includes a control mechanism for sampling input signals at a sampling frequency and generating an alternating current control voltage in response and for generating a two-axis voltage command. A phase correcting mechanism operating at a second frequency higher than the sampling frequency is provided for correcting the phase of the control voltage at the second frequency. A coordinate converting mechanism converts the voltage command into a multiphase voltage command in response to the phase of the voltage after the phase correction by the phase correcting mechanism.

4 Claims, 6 Drawing Sheets

POWER CONVERTER APPARATUS

BACKGROUND OF THE INVENTION

1. Field of the Invention

The present invention relates to a power converter apparatus and, more particularly, to a PWM power converter apparatus which can suppress low-frequency voltage distortion attributable to computing period of sampling control computation, i.e., attributable to sampling frequency.

2. Description of the Related Art

Referring to FIG. 4, a known power converter apparatus has a variable-voltage, variable-frequency power converter 1 composed of switching elements. This apparatus is adapted to covert an ordinary D.C. power into an A.C. power of desired voltage and frequency and to supply the A.C. power to a stator coil (not shown) of an induction motor 2. A rotor angular velocity detector 3 detects the angular velocity $\omega_r$ of the rotor of the motor 2. Current detectors $4_U$, $4_V$ and $4_W$ detect 3-phase currents $I_{1U}$, $I_{1V}$ and $I_{1W}$ supplied from the power converter 1 to the respective phases of the stator coil of the induction motor 2. Numeral 5 denotes a 3-phase-to-2-phase converter which converts the 3-phase currents $I_{1U}$, $I_{1V}$ and $I_{1W}$ derived from the current detectors $4_U$, $4_V$ and $4_W$ into values on a 2-axis rotating coordinate system (d-q coordinate system) which rotates in synchronization with the frequency $\omega_r$ of the A.C. voltage supplied to the stator coil of the induction motor 2, i.e., into stator coil currents $I_{1d}$ and $I_{1q}$.

Numeral 6 designates a magnetic flux computing device which computes magnetic fluxes $\phi_{2d}$ and $\phi_{2q}$ which interact with the rotor (not shown) of the induction motor 2, on the basis of the stator coil currents $I_{1d}$ and $I_{1q}$ and the stator coil windings $V_{1d}$ and $V_{1q}$ on the d-q coordinate system. A 2-axis-to-3-phase converter 7 converts the 2-axis voltage commands on the d-q coordinate system, i.e., the stator coil windings $V_{1d}$ and $V_{1q}$, into actual 3-phase instantaneous A.C. voltage commands $I_{1U}$, $I_{1V}$ and $I_{1W}$. A d-axis current controller 8 serves to control the d-axis current to the command level by, for example, performing PI (Proportional Integrating) control on the difference between the d-axis component command $I_{1d}$* and the actual value $I_{1d}$.

Similarly, a q-axis current controller functions to control the q-axis current to the command level by, for example, performing PI (Proportional Integrating) control on the difference between the q-axis component command $I_{1q}$* and the actual value $I_{1q}$. A magnetic flux controller 10 serves to control the rotor-coil interacting magnetic flux of the d-axis component $\phi_{2d}$ (referred to as "d-axis component magnetic flux", hereinafter) to a d-axis component magnetic flux command $\phi_{2d}$* which is generated internally. Numeral 11 designates a velocity controller which controls the rotor angular velocity $\omega_r$ to an internally generated rotor angular velocity command $\omega_r$*.

Numeral 12 designates a divider which receives outputs from the velocity controller 11 and the magnetic flux computing device 12, while 13 designates a coefficient device which receives the output from the divider 12. The divider 12 and the coefficient device 13 in cooperation compute slip frequency command $\omega_s$*. Numeral 14 denotes a subtracting device which subtracts the d-axis stator coil current $I_{1d}$ from the d-axis stator coil current command $I_{1d}$*. Numeral 15 denotes a subtracting device which subtracts the q-axis stator coil current $I_{1q}$ from the d-axis stator coil current command $I_{1q}$*. Numeral 16 denotes an adding device which sums the slip frequency command $\omega_s$* and the rotor angular velocity $\omega_r$. Numeral 17 denotes a subtracting device which subtracts the d-axis component magnetic flux $\phi_{2d}$ from the d-axis component magnetic flux command $\phi_{2d}$*. Numeral 18 denotes a subtracting device which subtracts the rotor angular velocity $\omega_r$ from the rotor angular velocity command $\omega_r$*. Numeral 19 designates an integrator which integrates the output of the adder 16.

FIG. 5 is a circuit diagram showing the construction of a practical example of the power converter 1 shown in FIG. 4. In FIG. 5, numeral 21 designates a D.C. power supply. Numerals **22*a* to 22*f* indicate switching elements connected to the D.C. power supply 21 and forming arms of the three phases. Numerals 23*a* to 23*f* are diodes which are connected to the switching elements 22*a* to 22*f*, respectively, in inverted parallel relation to the switching elements. A modulating circuit 24 generates modulation signals 24*a* to 24*f* and supplies these signals to the switching elements 22*a* to 22*f* so as to turn these elements on and off, in response to the 3-phase instantaneous A.C. voltage commands $V_{1U}$, $V_{1V}$ and $V_{1W}$ which have a 120° phase difference and which serve as sine-wave modulated control signals. The modulation signals 24*a* to 24*c* are supplied directly to the switching elements 22*a* to 22*c*, while the modulation signals 24*d* to 24*f* are supplied to the switching elements 22*d* to 22*f*** after inversion.

FIG. 6 is a circuit diagram showing the construction of a practical example of the modulating circuit 24 shown in FIG. 5. Numeral 25 denotes a carrier wave generator which generates a carrier wave (triangular wave) signal **25*a*, 26 denotes a comparator which compares the carrier wave signal 25*a* with the 3-phase instantaneous A.C. voltage commands $V_{1U}$, $V_{1V}$ and $V_{1W}$, thereby producing pulse-width-modulated (PWM) signals 26*a* to 26*c* as shown in FIG. 7. The signal 26*a* corresponds to the modulating signals 24*a* and 24*d*. The signal 26*b* corresponds to the modulating signals 24*b* and 24*e*. The signal 26*c* corresponds to the modulating signals 24*c* and 24*f***.

A description will now be given of the operation of the illustrated apparatus. The description will begin with the explanation of the current control. The 3-phase A.C. currents $I_{1U}$, $I_{1V}$ and $I_{1W}$, supplied from the power converter 1 to the stationary coil of the induction motor 2 are detected by the current detectors $4_U$, $4_V$ and $4_W$, and are supplied to the 3-phase-to-2-phase converter 5. The converter 5 converts the 3-phase currents $I_{1U}$, $I_{1V}$ and $I_{1W}$ into stator coil currents $I_{1d}$ and $I_{1q}$ on the 2-axis coordinate system (d-q coordinate system) which rotates in synchronization with the frequency $\omega_1$ of the 3-phase A.C. voltage commands $V_{1U}$, $V_{1V}$ and $V_{1W}$ applied to the stator coil of the induction motor 2. The conversion is conducted in accordance with the following equation (1):

$$\begin{bmatrix} I_{1d} \\ I_{1q} \end{bmatrix} = \sqrt{\frac{2}{3}} \begin{bmatrix} \cos\theta_1, & \cos\left(\theta_1 - \frac{2}{3}\pi\right), & \cos\left(\theta_1 + \frac{2}{3}\pi\right) \\ -\sin\theta_1, & -\sin\left(\theta_1 - \frac{2}{3}\pi\right), & -\sin\left(\theta_1 + \frac{2}{3}\pi\right) \end{bmatrix} \begin{bmatrix} I_{1U} \\ I_{1V} \\ I_{1W} \end{bmatrix} \quad (1)$$

In the equation (1) shown above, $_1$ indicates the phase of A.C. voltage obtained through the integrator 19, and is expressed by $\theta_1 = \int \omega_1 dt$. The d-axis current controller 8 performs a proportional integrating operation on the difference between the d-axis current command $I_{1d}^*$ and the stator coil current $I_{1d}$ of the stator coil, thus producing a d-axis voltage command $V_{1d}$ for the stator coil. Similarly, the q-axis current controller 9 performs a proportional integrating operation on the difference between the q-axis current command $I_{1q}^*$ and the stator coil current $I_{1q}$ of the stator coil, thus producing a q-axis voltage command $V_{1q}$ for the stator coil. The d-axis voltage command $V_{1d}$ and the q-axis voltage command $V_{1q}$ are converted by the 2-axis-to-3-phase converter into actual 3-phase instantaneous A.C. voltage commands $V_{1U}$, $V_{1V}$ and $V_{1W}$. The conversion is conducted in accordance with the following equation.

$$\begin{bmatrix} V_{1U} \\ V_{1V} \\ V_{1W} \end{bmatrix} = \sqrt{\frac{2}{3}} \begin{bmatrix} \cos\theta_1, & -\sin\theta_1 \\ \cos\left(\theta_1 - \frac{2}{3}\pi\right), & -\sin\left(\theta_1 - \frac{2}{3}\pi\right) \\ \cos\left(\theta_1 + \frac{2}{3}\pi\right), & -\sin\left(\theta_1 + \frac{2}{3}\pi\right) \end{bmatrix} \begin{bmatrix} V_{1d} \\ V_{1q} \end{bmatrix} \quad (2)$$

The 3-phase instantaneous A.C. voltage commands $V_{1U}$, $V_{1V}$ and $V_{1W}$ thus obtained are supplied to the power converter 1, whereby desired currents are supplied to the induction motor 2.

A description will now be given of the slip frequency control. The stator coil current and the stator coil current command can be regarded as being equal to each other in each of the axes d and q to meet the conditions of $I_{1d}^* = I_{1d}$ and $I_{1q} = I_{1q}^*$, provided that the above-described current control circuit system operates with a sufficiently high speed. In such a case,the state equation of the system of the induction motor 2, taking the stator coil currents $I_{1d}$ and $I_{1q}$ as the inputs, can be expressed by the following equations (3), (4) and (5).

$$\dot{\phi}_{2d} = \alpha\phi_{2d} + \omega_s\phi_{2q} + \beta I_{1d} \quad (3)$$

$$\dot{\phi}_{2q} = \alpha\phi_{2q} + \omega_s\phi_{2d} + \beta I_{1q} \quad (4)$$

$$\dot{\omega}_r = \tau(I_{1q}\phi_{2d} - I_{1d}\phi_{2q}) \quad (5)$$

In these equations, $\alpha$, $\beta$ and $\gamma$ are constants which are determined by the induction motor 2. The slip frequency $\omega_s$ is expressed by the following equation (6).

$$\omega_s = \omega_1 - \omega_r \quad (6)$$

Expressing the slip frequency also by the following equation (7), the condition of the equation (4) is transformed into the following formula (8).

$$\omega_s = \beta \frac{I_{1q}}{\phi_{2d}} \quad (7)$$

$$\dot{\phi}2_q = \alpha\phi2_q \quad (8)$$

Since the condition $\alpha < 0$ is met, the q-axis component magnetic flux $\phi_{2q}$ approaches zero as the time elapses. Thus, after a certain moment, it is possible to regard $\phi_{2q}$ as being 0, i.e., $\phi_{2q} = 0$. The command $\omega_s^*$ of the slip frequency $\omega_s$ is computed in accordance with the equation (7) by the divider 12 and the coefficient device 13. The adding device 16 adds the slip frequency command $\omega_s^*$ and the rotor angular velocity $\omega_r$ so as to compute the frequency $\omega_l$ of the A.C. voltage supplied to the stator coil of the induction motor 2. The integrator 19 integrates the values of the frequency $\omega_l$ to determine the A.C. voltage phase $\theta_l$, and the 2-axis-to-3-phase converter 7 performs the conversion in accordance with the equation (7) on the basis of the A.C. voltage phase $\theta_l$, whereby the 3-phase instantaneous A.C. voltage commands $V_{1U}$, $V_{1V}$ and $V_{1W}$ are obtained. These commands $V_{1U}$, $V_{1V}$ and $V_{1W}$ are applied to the power converter 1, whereby an A.C. voltage of the frequency $\omega_l$ is actually applied to the induction motor 2 by the power converter 1.

A description will now be given of the control of the magnetic fluxes. If the condition of $\phi_{2q} = 0$ is actually obtained in the above-described control of the slip frequency, the control of the magnetic flux is regarded as being the control of the d-axis component magnetic flux $\phi_{2d}$.

On condition of $\phi_{2q} = 0$, the equation (3) is transformed into the following equation (9).

$$\dot{\phi}_{2d} = \alpha\phi_{2d} + \beta I_{1d} \quad (9)$$

The equation (9) shows that the d-axis component magnetic flux $\phi_{2d}$ can be controlled to a desired value by controlling the d-axis stator coil current $I_{1d}$. The magnetic flux controller 10 conducts a proportional integrating operation on the difference between the d-axis component magnetic flux command $\phi_{2d}^*$ and the d-axis component magnetic flux $\phi_{2d}$, thereby producing the stator coil current command. $I_{1d}$. The value of the d-axis component magnetic flux $\phi_{2d}$ is determined by the magnetic flux computing device 6.

A description will now be given of the speed control. Provided that the condition of $\phi_{2q} = 0$ is achieved by the described slip frequency control and that the condition of $\phi_{2d} = \phi_{2d}^*$ is attained by the described magnetic flux control, the aforementioned equation (5) is transformed into the following equation (10).

$$\dot{\omega}_r = -\gamma\phi_{2d}^* I_{1q} \quad (10)$$

The equation (10) shows that the rotor angular velocity $\omega_r$ can be controlled to a desired value by operating the q-axis stator coil $I_{1q}$. The speed controller 11 conducts a proportional integrating operation on the difference between the rotor angular velocity command $\omega_r$* and the measured rotor angular velocity $\omega_r$, thus producing the command value $I_{1q}$* of the q-axis stator coil current $I_{1q}$.

The known PWM converter apparatus has the described construction. In order to reduce noise produced by the load such as an induction motor, high-speed switching elements such as IGBTs are used as the switching elements. In order to attain a high switching frequency of 15 to 20, it has been necessary to set the frequency of the carrier wave (triangular wave) to the high level of 15 to 20 KHz while increasing the frequency of the sampling control computation, i.e., the sampling frequency, to the same high level as that of the carrier wave. Hitherto, however, the sampling control computation could be done only at sampling frequencies lower than the frequency of the carrier wave (triangular wave), due to, for example, the limited performance of the microprocessor which conducts the sampling control computation. Consequently, the 3-phase A.C. voltage commands $V_{1U}$, $V_{1V}$ and $V_{1W}$ supplied to the power converter as sine-wave modulation control signals exhibit a stepped waveform, with the superposition of the sampling frequency which is lower than the frequency of the carrier wave (triangular wave) 25 as a result of the sampling computation, as indicated in greater scale by solid line in FIG. 3. For this reason, a periodic distortion of a low frequency is inevitably caused on the voltages after the PWM modulation, making it difficult to satisfactorily reduce the noise. Reduction in the noise is achievable to some extent by using a noise filter which eliminates noise, but the use of such filter undesirably complicates the construction of the whole apparatus.

SUMMARY OF THE INVENTION

Accordingly, an object of the present invention is to provide a power converting apparatus which effectively suppresses voltage distortion of low frequency attributable to sampling frequency of the sampling control computation, thus enabling reduction in the noise level of the load.

To this end, according to the present invention, there is provided a power converter apparatus, comprising:

phase correcting means for correcting the phase of A.C. voltage obtained through a sampling control computation at a frequency higher than the sampling frequency employed in the sampling control computation; and a coordinate converting means which performs, on the basis of the phase of the A.C. voltage after the phase correction effected by the phase correcting means, a coordinate conversion from the voltage command on a two-axis rotating coordinate obtained through the sampling control computation into multi-phase voltage command.

DESCRIPTION OF THE PREFERRED EMBODIMENT

An embodiment of the present invention will be described with reference to the drawings.

Figure 1:
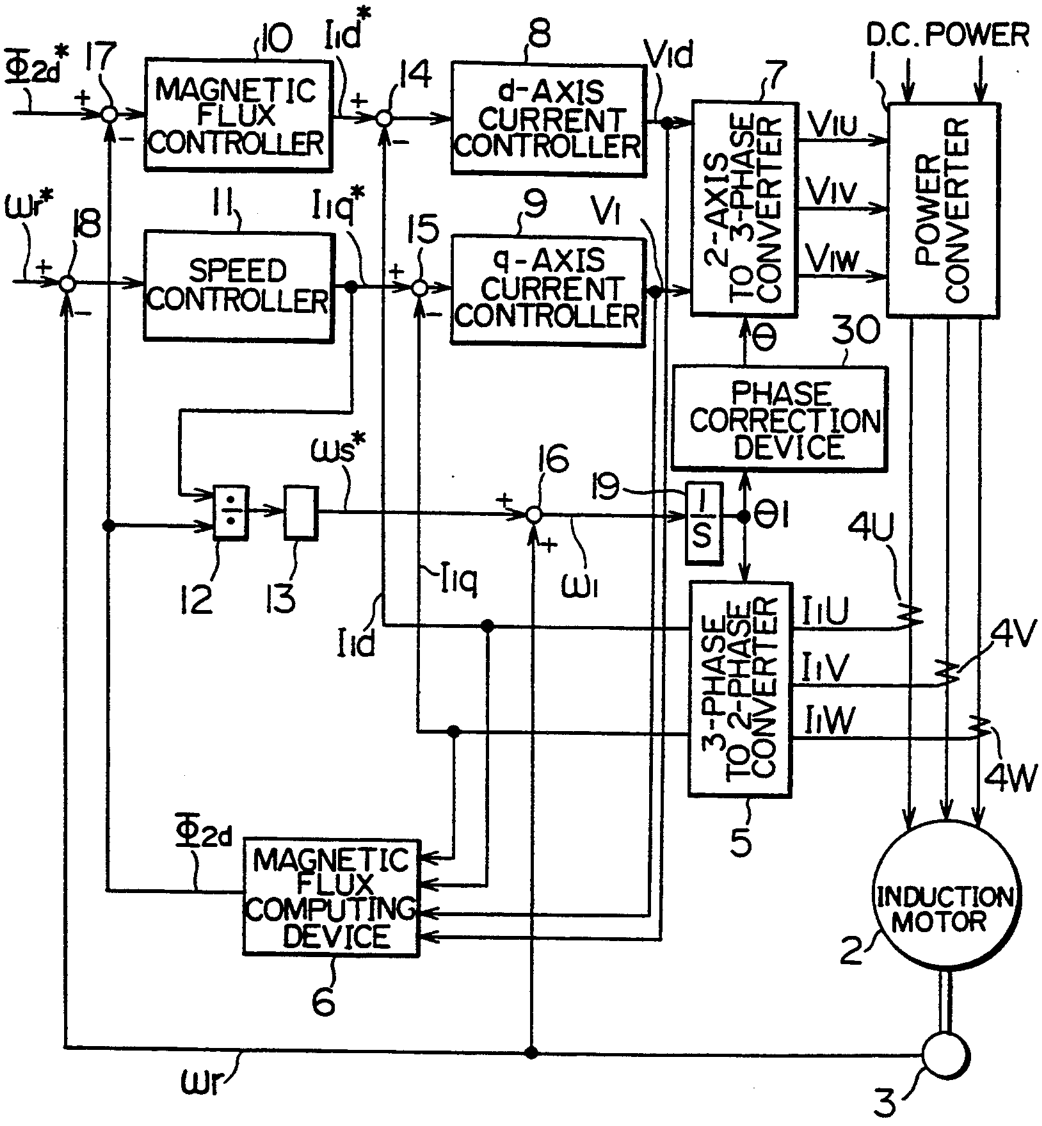
FIG. 1 is a block diagram showing the construction of a power converter apparatus embodying the present invention.
Figure 4:
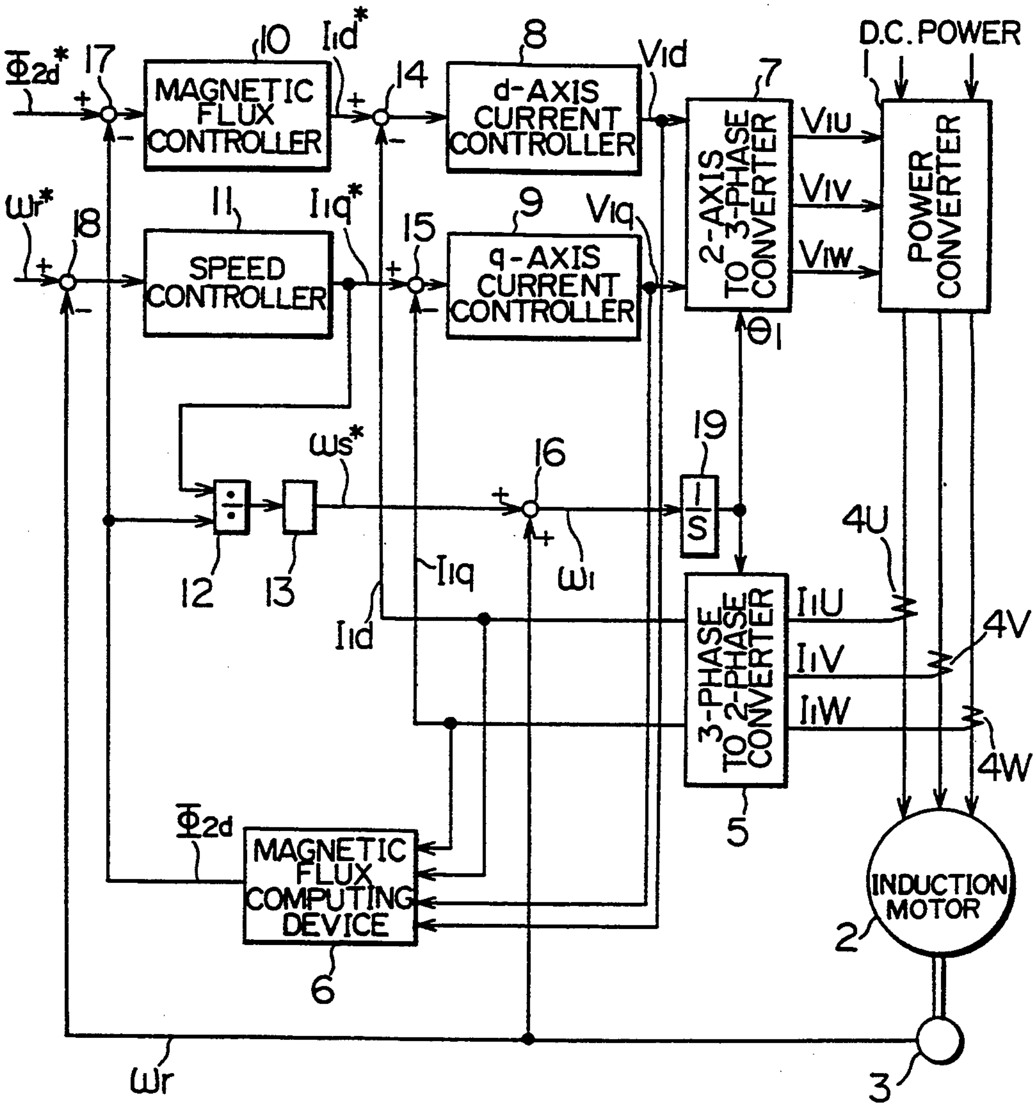
FIG. 4 (PRIOR ART)
FIG. 4 is a block diagram showing the construction of a known power converter apparatus.
Figure 5:
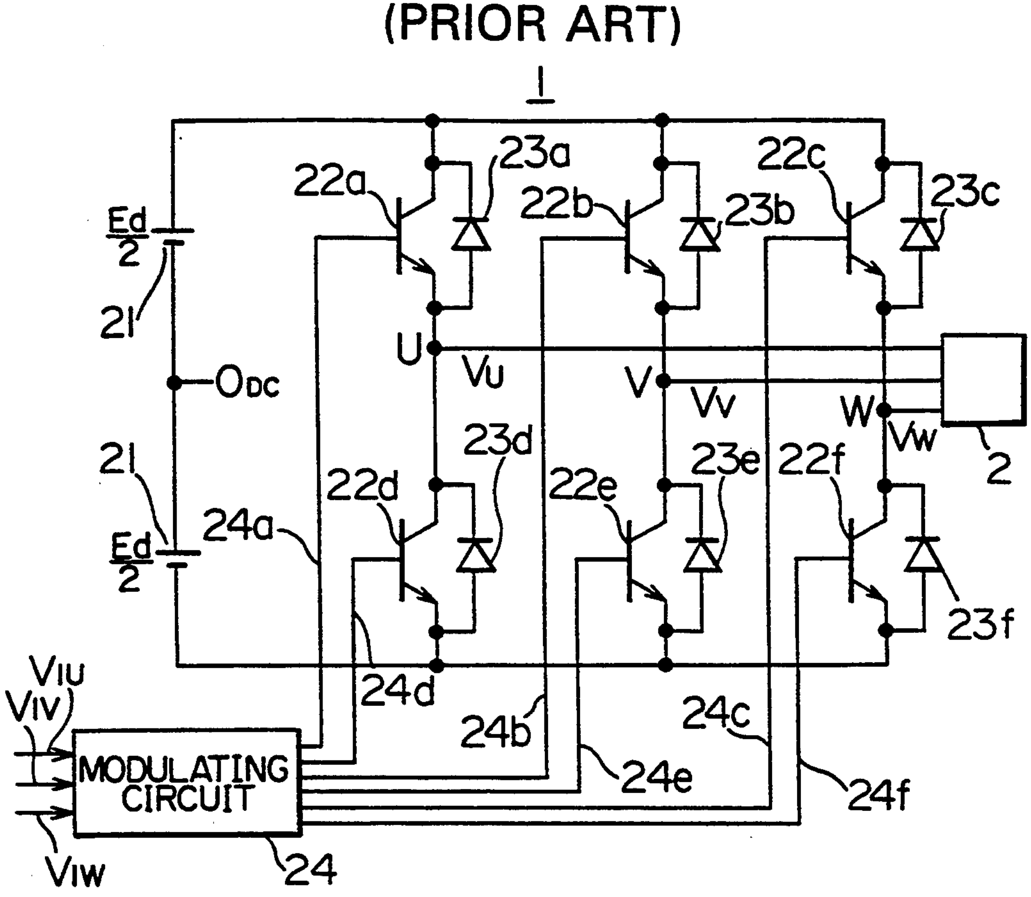
FIG. 5 (PRIOR ART)
FIG. 5 is an illustration of the construction of a power converter employed in the apparatus shown in FIG. 4.
Figure 6:
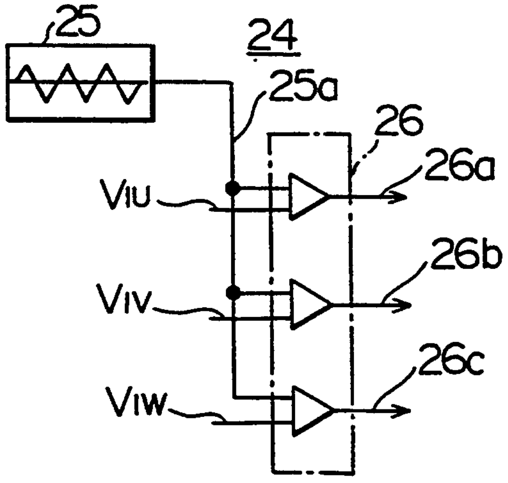
FIG. 6 (PRIOR ART)
FIG. 6 is an illustration of the construction of a modulating circuit employed in the apparatus shown in FIG. 4.
Figure 7:
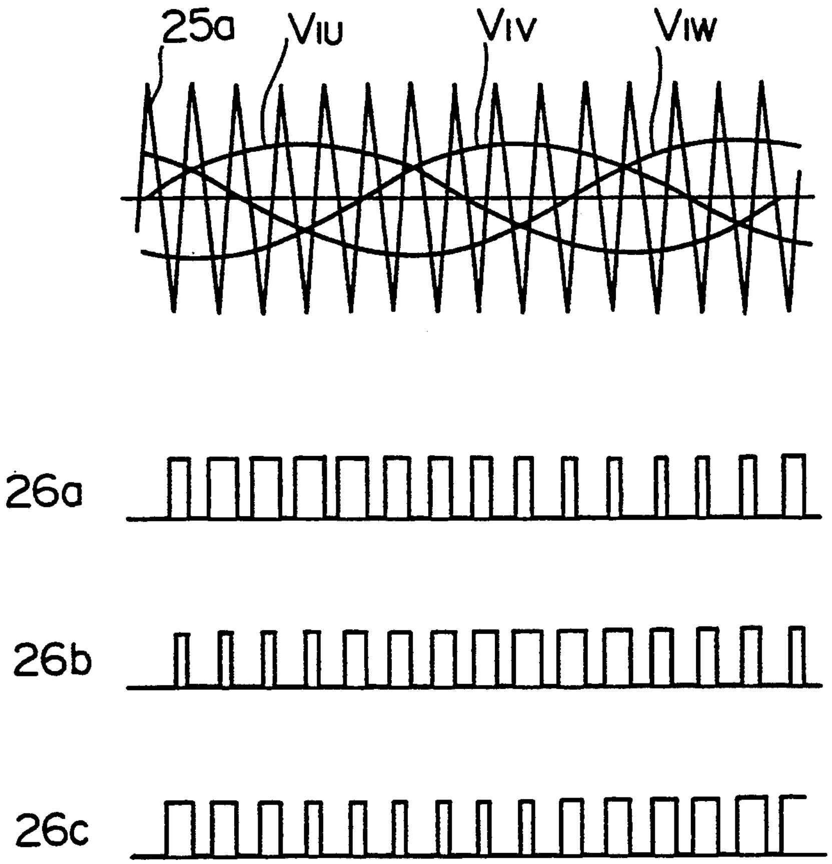
FIG. 7 (PRIOR ART)
FIG. 7 is a signal waveform chart showing waveforms of signals obtained at various portions of the circuit.

FIG. 1 is a block diagram showing the construction of a power converter apparatus embodying the present invention. In this Figure, the same reference numerals are used to denote the same parts or components as those used in the known apparatus shown in FIG. 4, and detailed description of such parts or components is omitted to avoid duplication of explanation. As shown in FIG. 1, the converter apparatus of the present invention incorporates a phase correcting device 30 which is provided between the integrator 19 and the 2-axis-to-3-phase converter 7 which acts as a coordinate converter. The phase corrector 30 corrects the phase of the A.C. voltage obtained through the sampling control computation at a frequency or period which is, for example, same as that of the carrier wave.

Figure 2:
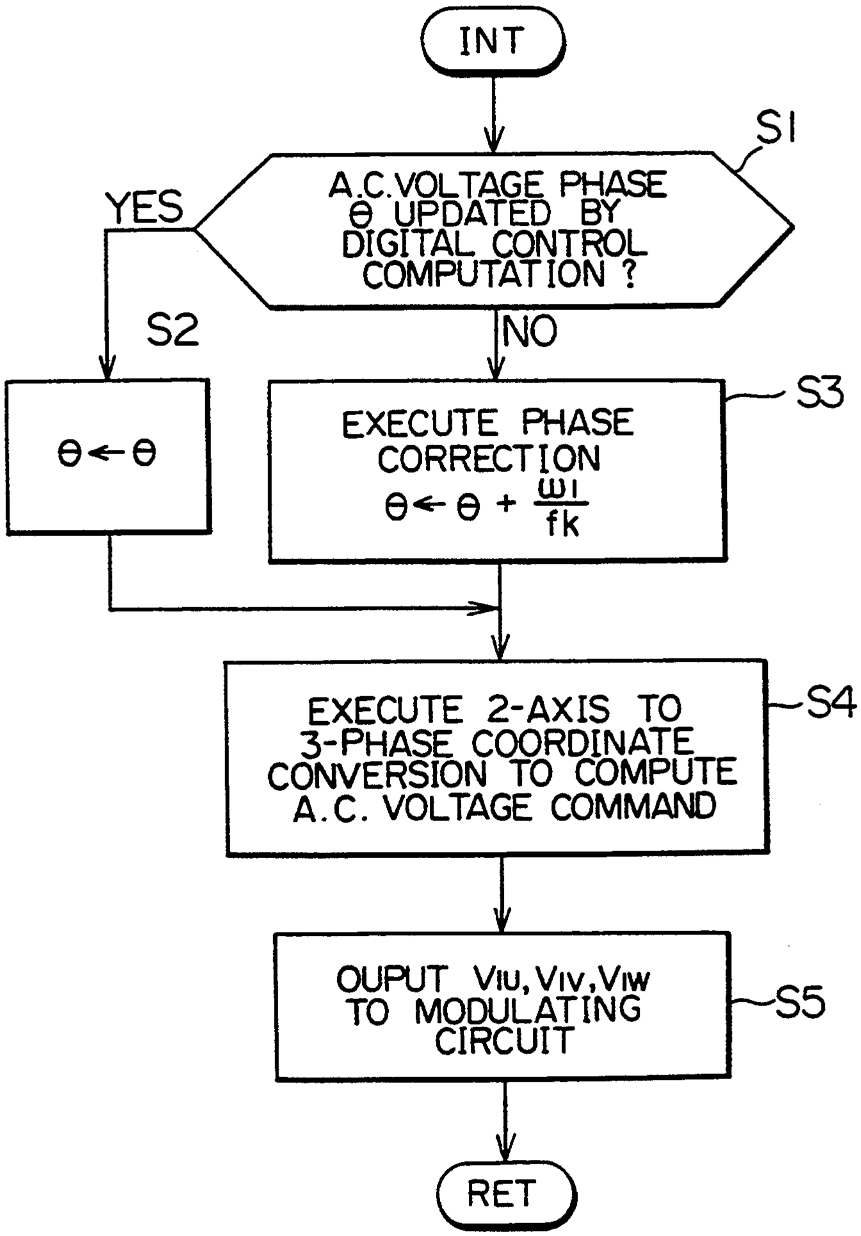
FIGS. 2 and 3 are a flow chart and a waveform chart illustrative of the operation of the embodiment shown in FIG. 1.

The operation of the phase corrector 30 and the 2-axis-to-3-phase converter 7 will be described with reference to FIG. 2. Interrupting computation is conducted at a frequency which is for example, equal to that of the carrier wave (triangular wave). In Step S1, the phase corrector 30 determines whether the phase $\theta$ of the A.C. voltage coming from the integrator 19 has been updated by a digital computation. If the phase has been updated, the phase correcting device 30 sets the value of the phase to $\theta$ in Step S2, whereas, if not, the process proceeds to Step S3 in which the phase correcting device performs a phase correction by setting $\theta+(\omega_l/f_k)$ as the value of the phase $\theta$, wherein $f_k$ represents the frequency of the carrier wave. Then, in Step S4, the 2-axis-to-3-phase converter 7 executes a conversion in accordance with the following equation (11), so as to convert the d-axis voltage command $V_{1d}$ and the q-axis voltage command $V_{1q}$ into 3-phase instantaneous A.C. voltage commands $V_{1U}$, $V_{1V}$ and $V_{1W}$.

$$\begin{bmatrix} V_{1U} \\ V_{1V} \\ V_{1W} \end{bmatrix} = \sqrt{\frac{2}{3}} \begin{bmatrix} \cos\theta, & -\sin\theta \\ \cos\left(\theta - \frac{2}{3}\pi\right), & -\sin\left(\theta - \frac{2}{3}\pi\right) \\ \cos\left(\theta + \frac{2}{3}\pi\right), & -\sin\left(\theta + \frac{2}{3}\pi\right) \end{bmatrix} \begin{bmatrix} V_{1d} \\ V_{1q} \end{bmatrix} \quad (11)$$

Figure 3:
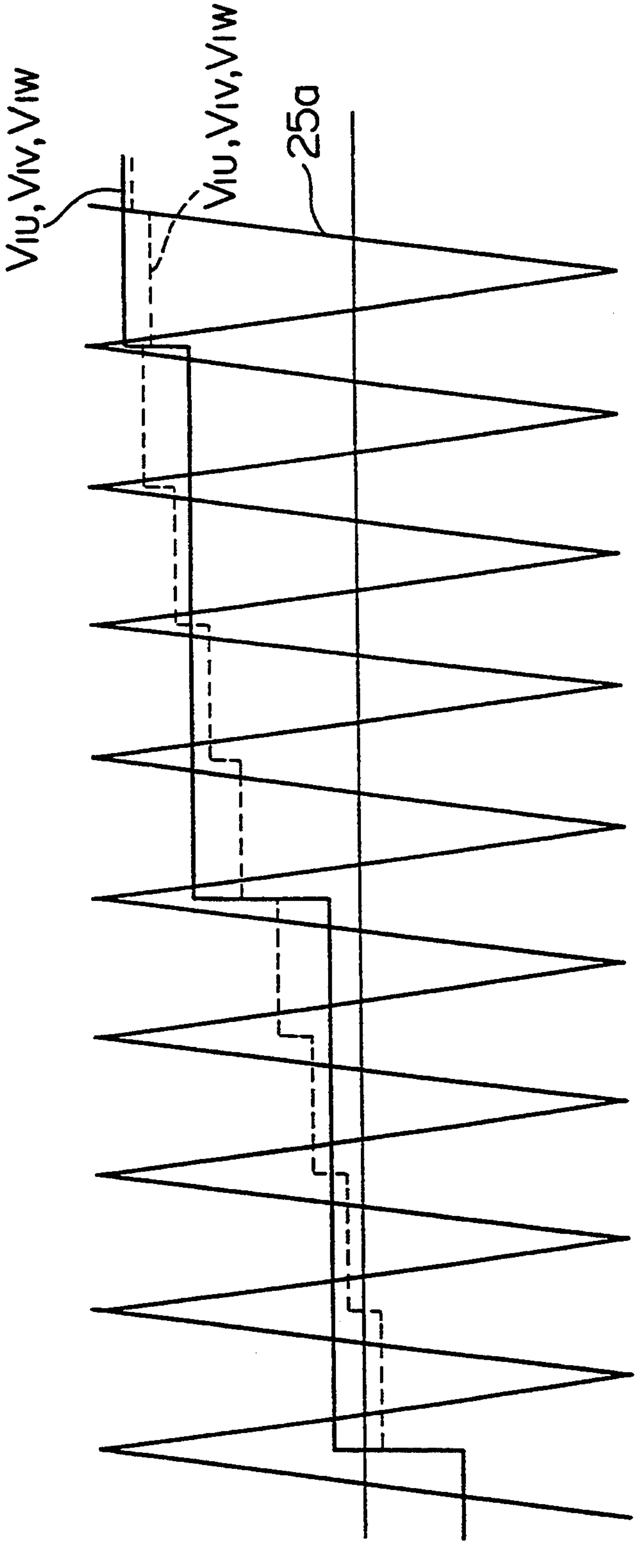

In the next step S5, the 2-axis-to-3-phase converter 7 delivers the 3-phase instantaneous A.C. voltage commands $V_{1U}$, $V_{1V}$ and $V_{1W}$ to the modulating circuit 24 of the power converter 1, as the sine-wave modulation control signals. As a result, the 3-phase instantaneous A.C. voltage commands $V_{1U}$, $V_{1V}$ and $V_{1W}$ exhibit stepped waveforms containing frequency components of frequencies substantially the same as that of the carrier wave (triangular wave) 25a, as shown by broken line in FIG. 3, with respect to the carrier wave (triangular wave) 25a. The sine-wave modulation control signals are compared with the carrier wave 25a by the comparator 26 in the modulation circuit 24, whereby pulse width modulation signals are obtained. The switching elements 20a to 22f of the power converter 1 are PWM-controlled with the thus-obtained pulse width modulation signals.

As will be understood from the foregoing description, according to the present invention, it is possible to elevate the sampling frequency superposed on the sine wave modulation control signals derived from the 2-axis-to-3-phase converter 7 to a high level substantially the same as that of the carrier wave. It is therefore possible to suppress low-frequency voltage distortion attributable to the sampling frequency. The sampling frequency need not always be elevated to the same level as the frequency of the carrier wave, provided that the low-frequency voltage distortion is satisfactorily suppressed.

Although an embodiment using 3-phase A.C. signals has been specifically described, it is to be understood that the invention can equally be applied to the cases where other multi-phase A.C. signals are employed.

What is claimed is:

1. A power converter apparatus comprising:

control means for sampling input signals at a sampling frequency and generating an alternating current control voltage having a phase $\theta$ and a two-axis voltage command in response to the sampling;

phase correcting means operating at a second frequency higher than the sampling frequency for correcting the phase of the control voltage to $\theta+\omega 1/f_k$, where $\theta 1$ represents the frequency of the control voltage and $f_k$ represents the frequency of a carrier wave, at the second frequency to generate a corrected control voltage; and coordinate converting means connected to the phase correcting means and the control means for converting the two-axis voltage command into a multi-phase voltage command responsive to the phase of the corrected control voltage.

2. The converter apparatus according to claim 1 wherein the second frequency is the same as the carrier wave frequency.

3. A power converter apparatus comprising:

a power converter for converting direct current into an alternating current in response to a multi-phase voltage command;

an induction motor driven by the alternating current and having an angular velocity determined by the alternating current;

a control mechanism sampling at least one of the angular velocity and the alternating current at a sampling frequency and generating an alternating current control voltage having a phase $\theta$ and a two-axis voltage command in response to the sampling;

phase correcting means operating at a second frequency higher than the sampling frequency for correcting the phase of the control voltage to $\theta+\omega 1/f_k$, where $\theta 1$ represents the frequency of the control voltage and $f_k$ represents the frequency of a carrier wave, at the second frequency to generate a corrected control voltage; and coordinate converting means connected to the control mechanism and the phase correcting means for converting the voltage command into the multi-phase voltage command in response to the phase of the corrected control voltage.

4. The converter apparatus according to claim 3 wherein the power converter includes a modulation circuit operated at a switching frequency higher than the sampling frequency for controlling modulation of the direct current and wherein the phase correcting means corrects the phase of the voltage at the switching frequency.

* * * * *

UNITED STATES PATENT AND TRADEMARK OFFICE

CERTIFICATE OF CORRECTION

PATENT NO. : 5,400,240

DATED : March 21, 1995

INVENTOR(S) : Hiroshi Araki

It is certified that error appears in the above-indentified patent and that said Letters Patent is hereby corrected as shown below:

Column 7, Line 42, change "$\theta 1$" to --$\omega 1$--;

Column 8, Line 27, change "$\theta 1$" to --$\omega 1$--;

Signed and Sealed this

Fourth Day of July, 1995

Attest:

BRUCE LEHMAN

*Attesting Officer* *Commissioner of Patents and Trademarks*